United States Patent
Tene et al.

(10) Patent No.: US 7,742,398 B1
(45) Date of Patent: Jun. 22, 2010

(54) INFORMATION REDIRECTION

(75) Inventors: Gil Tene, San Carlos, CA (US); Shyam Prasad Pillalamarri, Los Altos Hills, CA (US); Michael Wolf, San Francisco, CA (US)

(73) Assignee: Azul Systems, Inc., Mountain View, CA (US)

( * ) Notice: Subject to any disclaimer, the term of this patent is extended or adjusted under 35 U.S.C. 154(b) by 1670 days.

(21) Appl. No.: 10/823,414

(22) Filed: Apr. 12, 2004

(51) Int. Cl.
*G01R 31/08* (2006.01)

(52) U.S. Cl. .................................... 370/217; 370/221
(58) Field of Classification Search .................. None
See application file for complete search history.

(56) References Cited

U.S. PATENT DOCUMENTS

| | | | | |
|---|---|---|---|---|
| 6,104,717 | A * | 8/2000 | Coile et al. ................ | 370/401 |
| 6,138,020 | A * | 10/2000 | Galyas et al. .............. | 455/436 |
| 6,636,499 | B1 * | 10/2003 | Dowling .................... | 370/338 |
| 6,731,637 | B2 * | 5/2004 | Ikeda et al. ............... | 370/395.2 |
| 6,785,245 | B1 * | 8/2004 | Lee et al. .................. | 370/256 |
| 7,197,542 | B2 * | 3/2007 | Ponzio, Jr. ................ | 709/217 |
| 7,203,757 | B2 * | 4/2007 | Murakami ................ | 709/230 |
| 7,212,527 | B2 * | 5/2007 | Shah et al. ................ | 370/389 |
| 7,249,347 | B2 * | 7/2007 | Chang et al. ............. | 717/113 |
| 2002/0035681 | A1 * | 3/2002 | Maturana et al. ......... | 713/151 |
| 2002/0052978 | A1 * | 5/2002 | Stall ........................ | 709/313 |
| 2002/0141401 | A1 * | 10/2002 | Albert et al. .............. | 370/389 |
| 2003/0055877 | A1 * | 3/2003 | Williams et al. .......... | 709/203 |
| 2003/0097360 | A1 * | 5/2003 | McGuire et al. .......... | 707/8 |
| 2003/0126271 | A1 * | 7/2003 | Mowry et al. ............. | 709/230 |
| 2003/0156552 | A1 * | 8/2003 | Banker et al. ............. | 370/266 |
| 2003/0167421 | A1 * | 9/2003 | Klemm ..................... | 714/37 |
| 2004/0001474 | A1 * | 1/2004 | Simelius et al. .......... | 370/349 |
| 2004/0146044 | A1 * | 7/2004 | Herkerdorf et al. ....... | 370/351 |
| 2004/0193895 | A1 * | 9/2004 | Kaneko .................... | 713/188 |

OTHER PUBLICATIONS

P. Srisuresh et al., Middlebox communication architecture and framework, Aug. 2002, http://www.ietf.org/rfc/rfc3303.txt.

* cited by examiner

*Primary Examiner*—Jayanti K Patel
*Assistant Examiner*—Hooman Houshmand
(74) *Attorney, Agent, or Firm*—Van Pelt, Yi & James LLP

(57) ABSTRACT

A technique is disclosed for redirecting information in a segmented virtual machine. The technique includes sending information to a shell VM and redirecting the information to bypass the shell VM. A technique for evaluating whether to redirect information may include sending a discovery packet, receiving a reply to the discovery packet; and determining whether a switch is capable of stitching based on the reply. A technique for responding to a discovery packet may include receiving the discovery packet at a switch and sending a response indicating a capability of the switch.

27 Claims, 10 Drawing Sheets

STATE 3

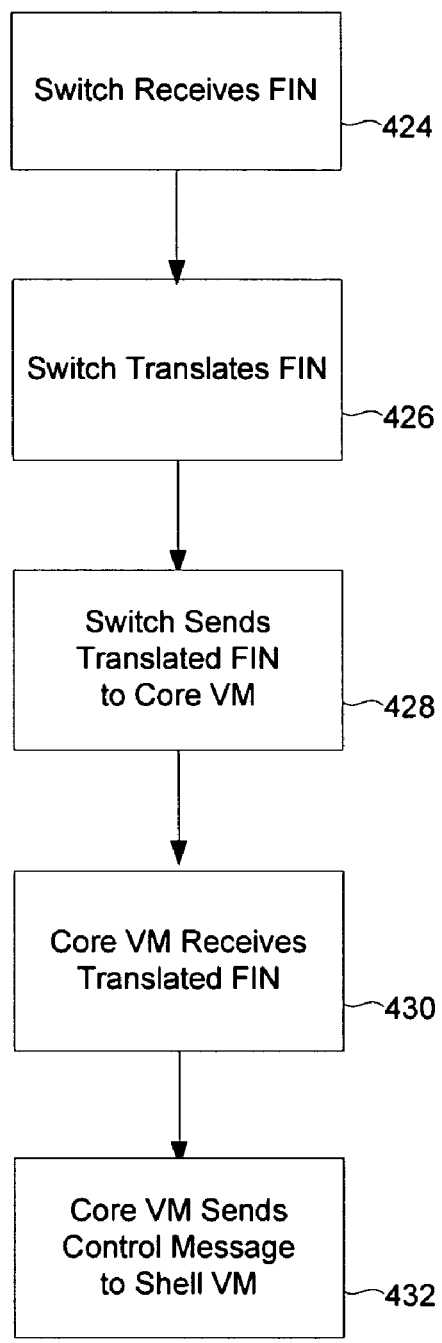
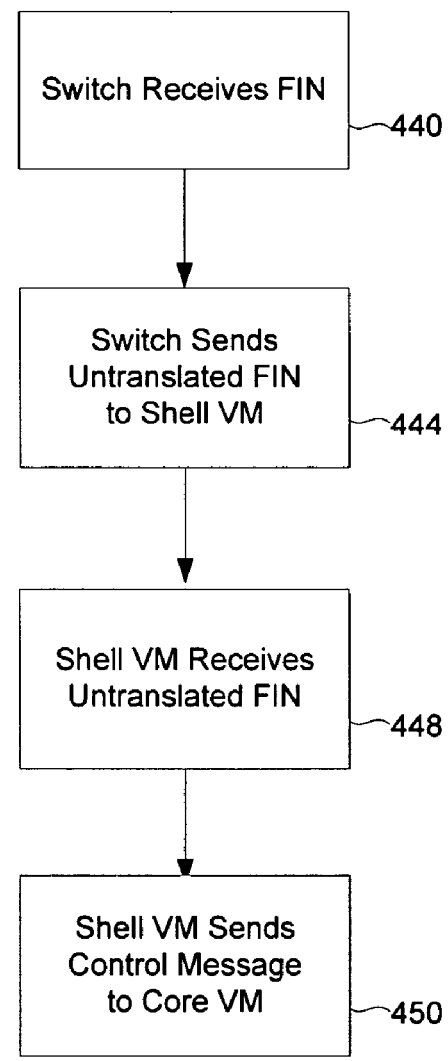
FIG. 4C
FIG. 4D

INFORMATION REDIRECTION

FIELD OF THE INVENTION

The present invention relates generally to computing environments. More specifically, a technique for redirecting information is disclosed.

BACKGROUND OF THE INVENTION

In many computing environments, information may be passed from one device to another typically more powerful device to perform certain computing tasks, such as processing, storage, or communication. Such information may include processes, data, functions, or any other information that consumes computing resources. Information may be sent in packet form or in some other type of data stream in various applications. For example, a virtual machine (VM) may be segmented into a shell and core VM, and function calls to the shell VM may be passed to the core VM for processing. Segmented virtual machines are further described in U.S. patent application Ser. No. 10/378,061, entitled SEGMENTED VIRTUAL MACHINE filed Feb. 28, 2003 which is incorporated herein by reference for all purposes.

FIG. 1 is a block diagram illustrating a system including a segmented VM. In this example, VM functionality is segmented into shell VM 108 and core VM 112. Shell VM 108 performs interactions with the external environment, such as with external application 104. Core VM 112 performs VM internal execution functions. External interactions may be passed from external application 104 through shell VM 108 to core VM 112 for processing. For example, file or network I/O, operating system calls, and other native library interactions may be passed to core VM 112. In J2EE and Java server environments, many of these forwarded interactions may be TCP/IP connection packets (to/from web tier, DB tiers, clustering traffic, etc.). There is a certain amount of load associated with forwarding these interactions through shell VM 108. If this load is large enough, shell VM 108 may bottleneck the segmented VM's performance, and much of core VM 112's computing capability may be wasted. Thus, it would be desirable to reduce the load associated with forwarding certain types of interactions through the shell VM.

BRIEF DESCRIPTION OF THE DRAWINGS

The present invention will be readily understood by the following detailed description in conjunction with the accompanying drawings, wherein like reference numerals designate like structural elements, and in which:

FIGS. 4B-4E are flowcharts illustrating various ways to terminate a connection.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A segmented virtual machine may include a shell VM for external interactions and a core VM for internal execution functions. An external application and the core VM may communicate using the shell VM as an interface. Information forwarded from the external application to the shell VM may be intercepted by a switch that redirects the information to the core VM. Likewise, information forwarded from the core VM to the shell VM may be intercepted by the switch that redirects the information to the external application.

Figure 1:
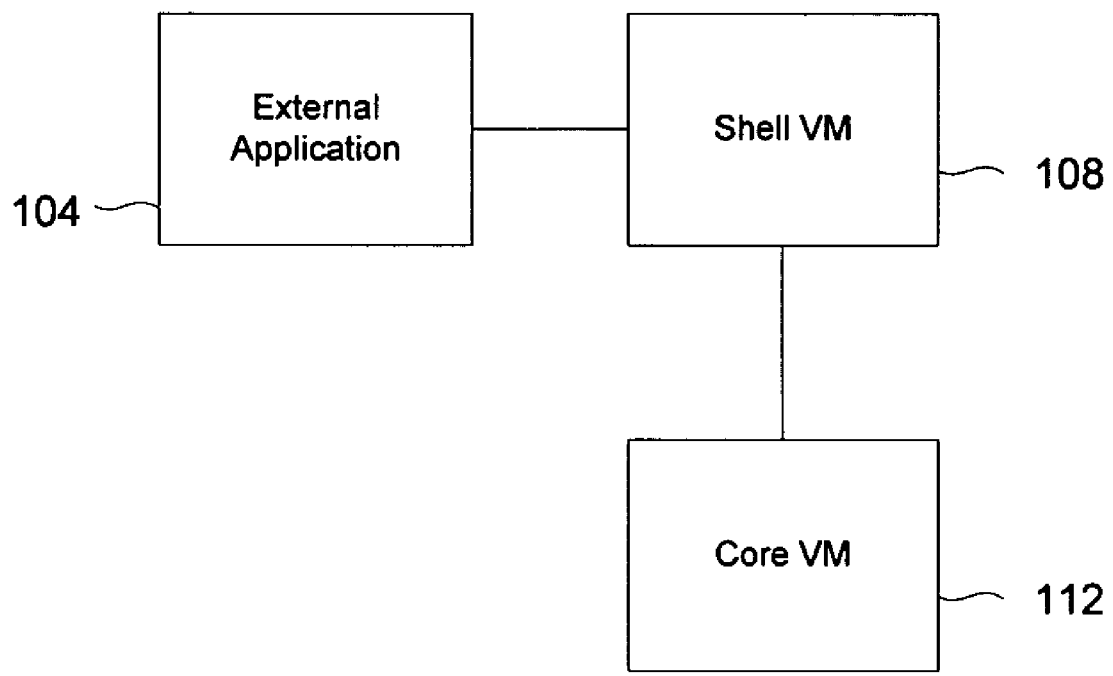
FIG. 1 is a block diagram illustrating a system including a segmented VM.
Figure 2:
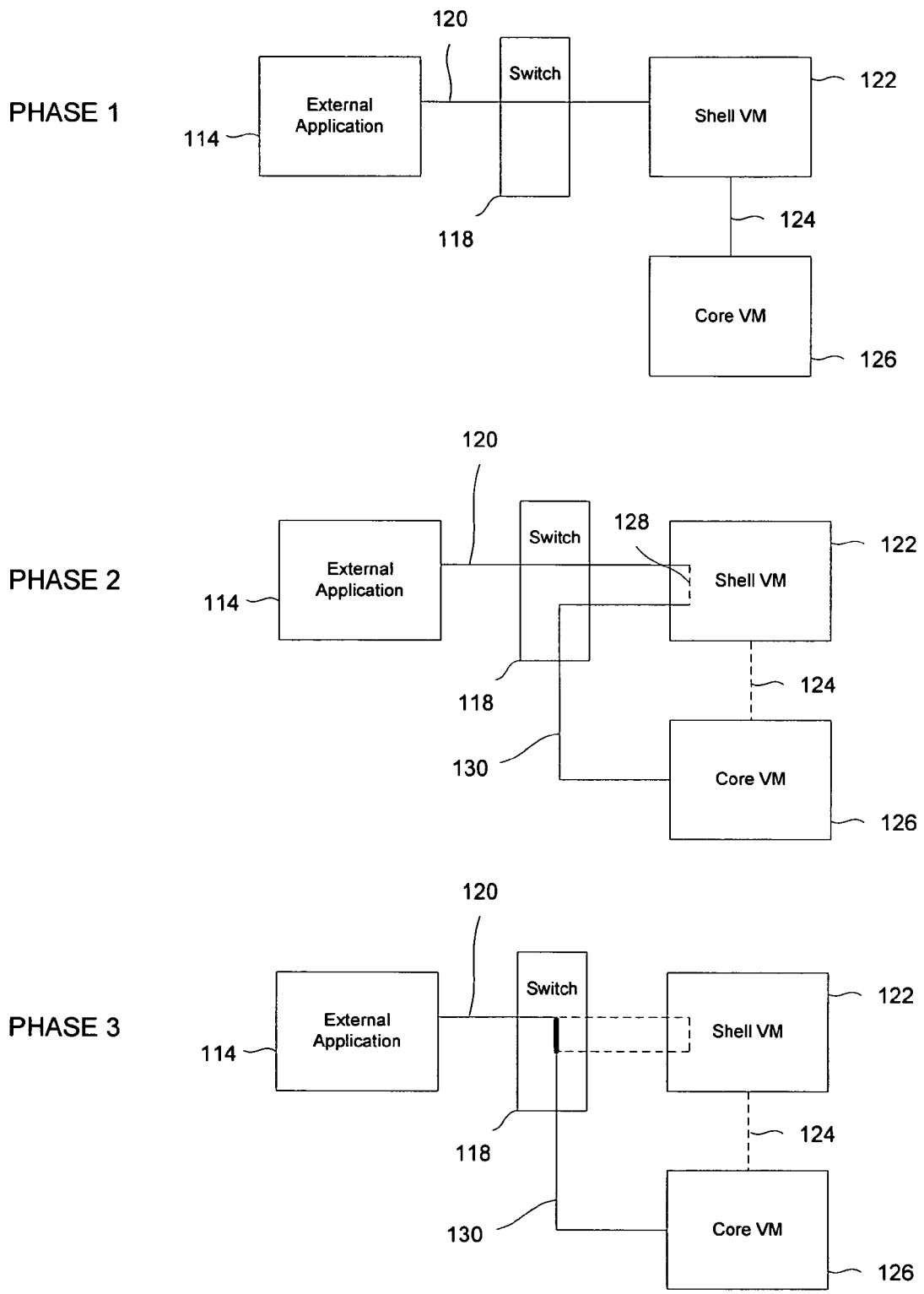
FIG. 2 is a block diagram illustrating a redirection of a TCP connection.

FIG. 2 is a block diagram illustrating a redirection of a TCP connection. In this and the following examples, TCP is merely an example of one network protocol that may be used. Any other appropriate network protocol may be used. In this example, a TCP connection is redirected in three phases, where phase 1 shows the initial state, with a TCP connection 120, phase 2 shows a second TCP connection 130, and phase 3 shows the two TCP connections stitched. A detailed description of each phase follows.

Phase 1 shows the initial state of the system. The system is shown to include a segmented VM (shell VM 122 and core VM 126), switch 118, and external application 114. External application 114 may be a client application, such as a web server or a PC, or a server application, such as a database server. A TCP connection 120 is established between external application 114 and shell VM 122. TCP connection 120 may be initiated by external application 114 or by an application running on the segmented VM. The content of TCP connection 120 is transferred as needed between shell VM 122 and core VM 126 over a communications link 124. Communications link 124 may include one or more paths, where each path may include one or more channels.

In phase 2, a new TCP connection 130 is established between shell VM 122 and core VM 126. TCP connection 130 may be initiated by shell VM 122 or by any other appropriate device, such as switch 118. The content of TCP connection 120 that was transferred over communications link 124 in phase 1 is then transferred over the new TCP connection 130.

This may be accomplished by altering TCP packet headers. For example, shell VM 122 receives a TCP packet on TCP connection 120, alters the header, and sends the TCP packet on TCP connection 130.

In phase 3, TCP connections 120 and 130 are stitched by switch 118. Switch 118 intercepts TCP packets from external application 114 and redirects the packets to TCP connection 130. Shell VM 122 no longer needs to receive or send any TCP packets. For example, switch 118 receives a TCP packet on TCP connection 120 from external application 114. Switch 118 alters the header of the packet, and sends the TCP packet on TCP connection 130 to core VM 126. By bypassing shell VM 122, the load on shell VM 122 is reduced.

TCP packets may be sent from external application 114 to core VM 126, as well as from core VM 126 to external application 114. Neither external application 114 nor core VM 126 needs to be aware of the redirection. Additionally, external application 114 does not need to be aware of the VM segmentation.

The decision to bypass the shell VM may be made based on such factors as the current state of the shell VM, type of connection, time, or amount of received data. For example, if the shell VM reaches a certain load, the connection may be redirected around the shell VM. If the connection is a long-lived connection, it may be more efficient to redirect the connection around the shell VM. A long-lived connection may be defined based on an elapsed time or the number of packets sent since the connection was initiated. The shell VM may also be configured to be bypassed after the initiation of a connection.

In some embodiments, the shell VM handles slow path traffic, such as connection initiation and termination. The core VM handles fast path traffic, which can include the bulk of the application's network traffic and computing tasks. Once identified as such by the shell VM, fast path traffic travels directly between the switch and the core VM without incurring load on the shell VM.

Preferably, the shell VM makes the decision to bypass the shell VM. The shell VM then informs the switch that the connection should be redirected, and the switch performs the redirection.

Figure 3A:
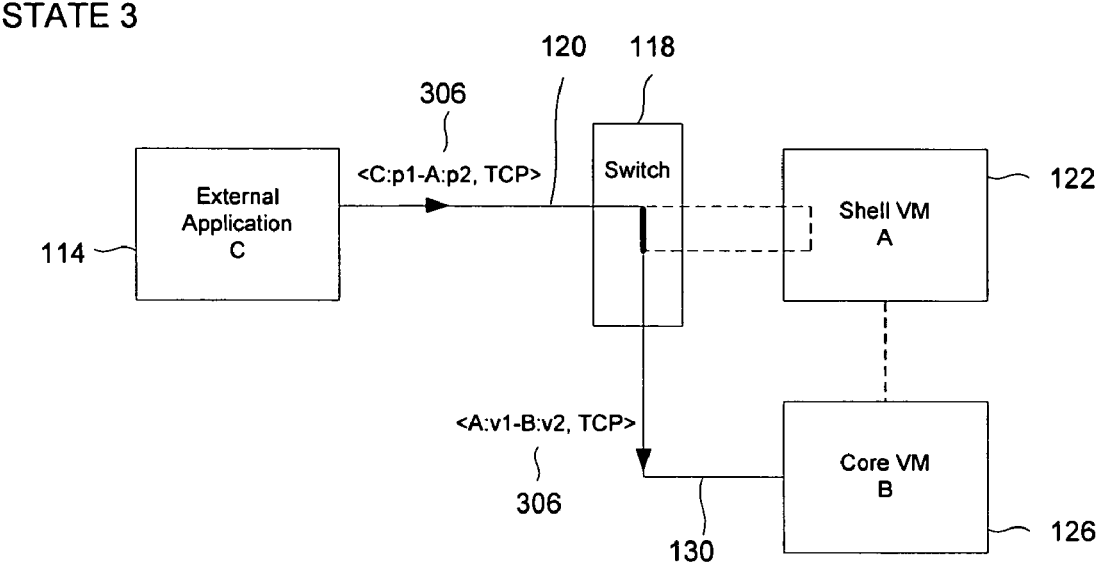
FIGS. 3A-3B illustrate how a packet from an external application is redirected during phase 3.
Figure 3B:
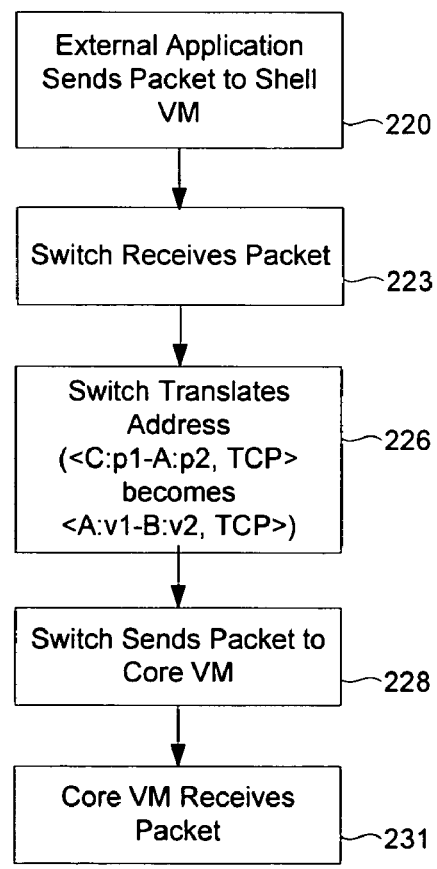

FIGS. 3A-3B illustrate how a packet from an external application is redirected during phase 3. The system is shown to include external application 114 with IP address C, switch 118, shell VM 122 with IP address A, and core VM 126 with IP address B. TCP connection 120 is stitched to TCP connection 130 by switch 118.

External application 114 sends a TCP packet 306 to shell VM 122 (220). As shown, packet 306 is addressed from source address C with port p1 to destination address A with port p2, where p1 and p2 are associated with ports on application 114 and shell VM 122, respectively.

Switch 118 receives packet 306 (223). Switch 118 translates the addresses (226) so that packet 306 is now addressed from source address A with port v1 to destination address B with port v2, where v1 and v2 are associated with ports on shell VM 122 and core VM 126, respectively. A TCP sequence number and checksum are translated appropriately and a valid TCP packet is formed. Switch 118 sends packet 306 to core VM 126 (228). Core VM 126 receives packet 306 (231). External application 114 is not aware that packet 306 was not sent to shell VM 122. Likewise, core VM 126 is not aware that packet 306 was not sent by shell VM 122.

Figure 3C:
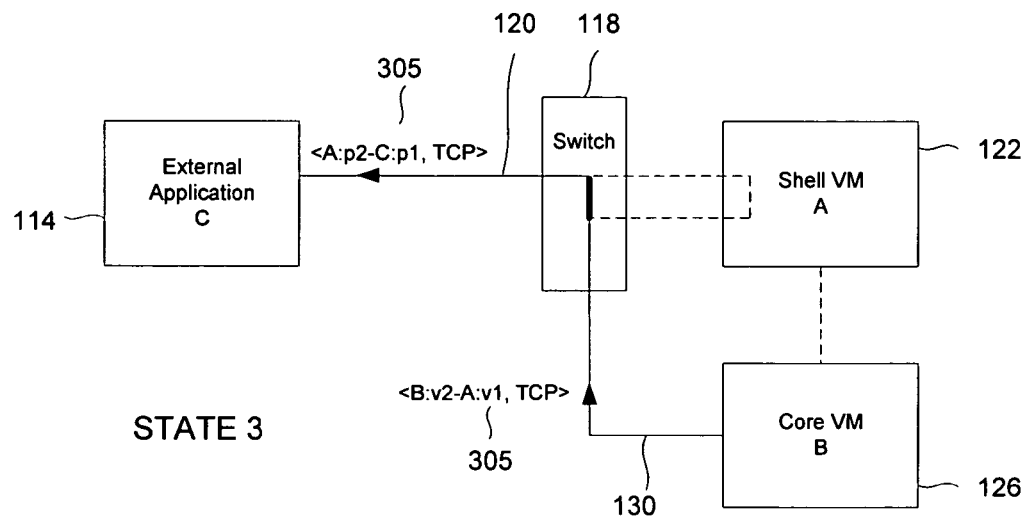
FIGS. 3C-3D illustrate how a packet from a core VM is redirected during phase 3.
Figure 3D:
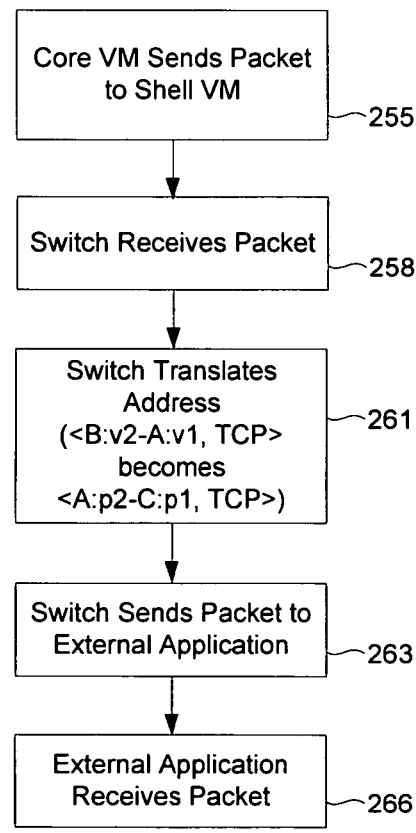

A packet sent from core VM 126 to shell VM 122 may also be redirected. FIGS. 3C-3D illustrate how a packet from a core VM is redirected during phase 3. In this example, core VM 126 sends a packet 305 to shell VM 122 (255). As shown, packet 305 is addressed from source address B with port v2 to destination address A with port v1, where v2 and v1 are associated with ports on core VM 126 and shell VM 122, respectively.

Switch 118 then receives packet 305 (258). Switch 118 translates the address (261) so that packet 305 is now addressed from source address A with port p2 to destination address C with port p1, where p2 and p1 are associated with ports on shell VM 122 and external application 114, respectively. A TCP sequence number and checksum are translated appropriately and a valid TCP packet is formed. Switch 118 sends packet 305 to external application 114 (263). External application 114 receives packet 305 (266). Core VM 126 is not aware that packet 305 was not sent to shell VM 122. Likewise, external application 114 is not aware that packet 305 was not sent by shell VM 122. Thus, packet redirection may be transparent to both the sending and receiving devices, as illustrated in this and the previous example (FIGS. 3A-3B).

Figure 4A:
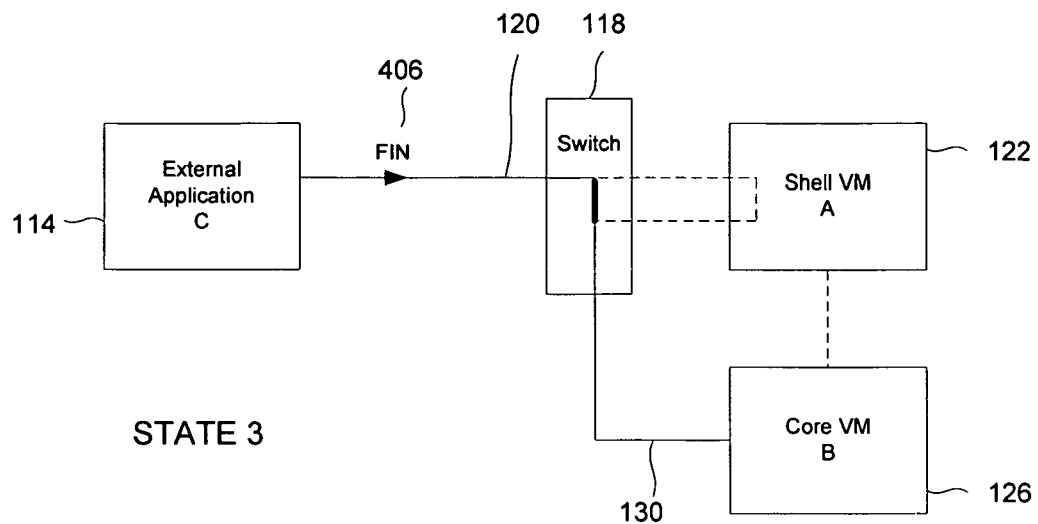
FIG. 4A is a block diagram illustrating the initiation of connection termination during phase 3.

FIG. 4A is a block diagram illustrating the initiation of connection termination during phase 3. In this example, the system is shown to include external application 114, switch 118, shell VM 122, and core VM 126. The system is in phase 3 and TCP connection 120 is stitched to TCP connection 130 by switch 118. In this example, external application 114 initiates the tear down of TCP connection 120. External application 114 sends FIN 406 to shell VM 122. A FIN, or TCP packet with the FIN (finish) flag set to 1, indicates that a sender is finished sending data. Each participating device needs to somehow be informed of the termination. There are numerous ways this may be done. Several examples are illustrated in FIGS. 4B-4E.

Figure 4B:
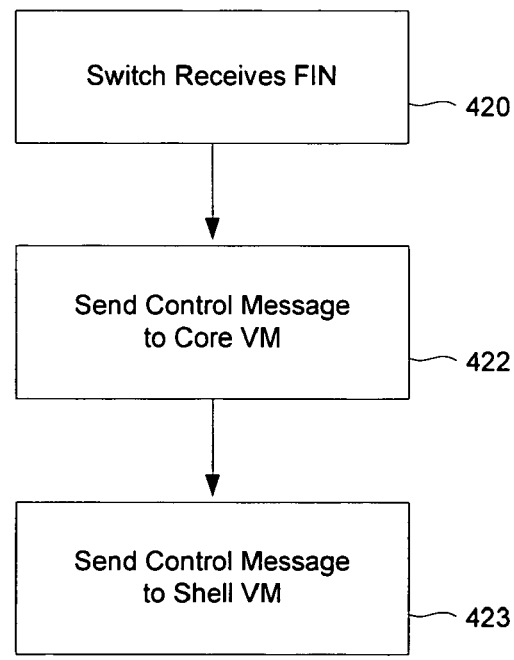

In FIG. 4B, when a switch receives a FIN (420), control messages are sent to the core VM (422) and shell VM (423) to indicate the connection termination.

In FIG. 4C, when a switch receives a FIN (424), the switch translates the FIN (426), and sends the translated FIN (428) to the core VM. The core VM receives the translated FIN (430). The core VM sends a control message to the shell VM to indicate the termination (432).

In FIG. 4D, when a switch receives a FIN (440), the switch knows not to translate the FIN. The switch sends the untranslated FIN (444) to the shell VM. The shell VM receives the untranslated FIN (448), and sends a control message to the core VM (450) to indicate the termination.

Figure 4E:
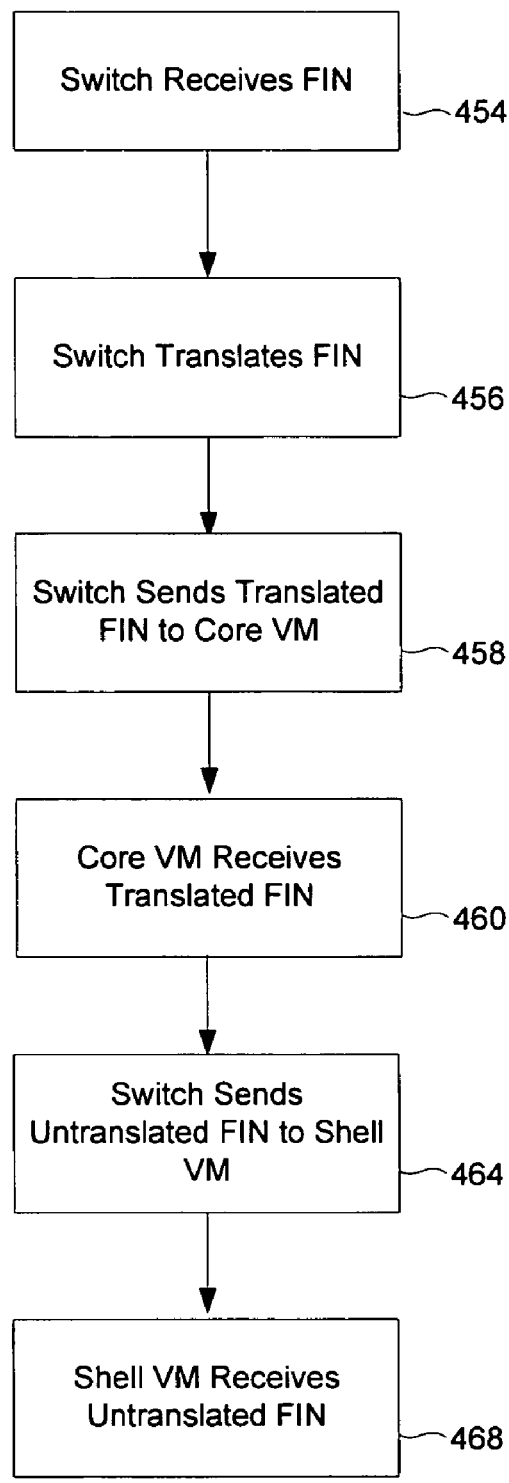

In FIG. 4E, when a switch receives a FIN (454), the switch translates the FIN (456) and sends the translated FIN (458) to the core VM. The core VM receives the translated FIN (460). The switch also sends the untranslated FIN (464) to the shell VM, so the shell VM receives the untranslated FIN (468).

Finally, a FIN acknowledgement (ACK) is sent to external application 114. There are numerous ways this can be done. For example, when a device sends a control message, it can also send a FIN ACK.

In the above examples, external application 114 is shown to initiate the tear down. These examples may be analagously applied when core VM 126 initiates the teardown. In step 432, the external application may not be aware of the segmentation of the VM, so it may be necessary for the core VM or switch to send the control message to the shell VM. The above examples may also be applied to a reset.

Figure 5A:
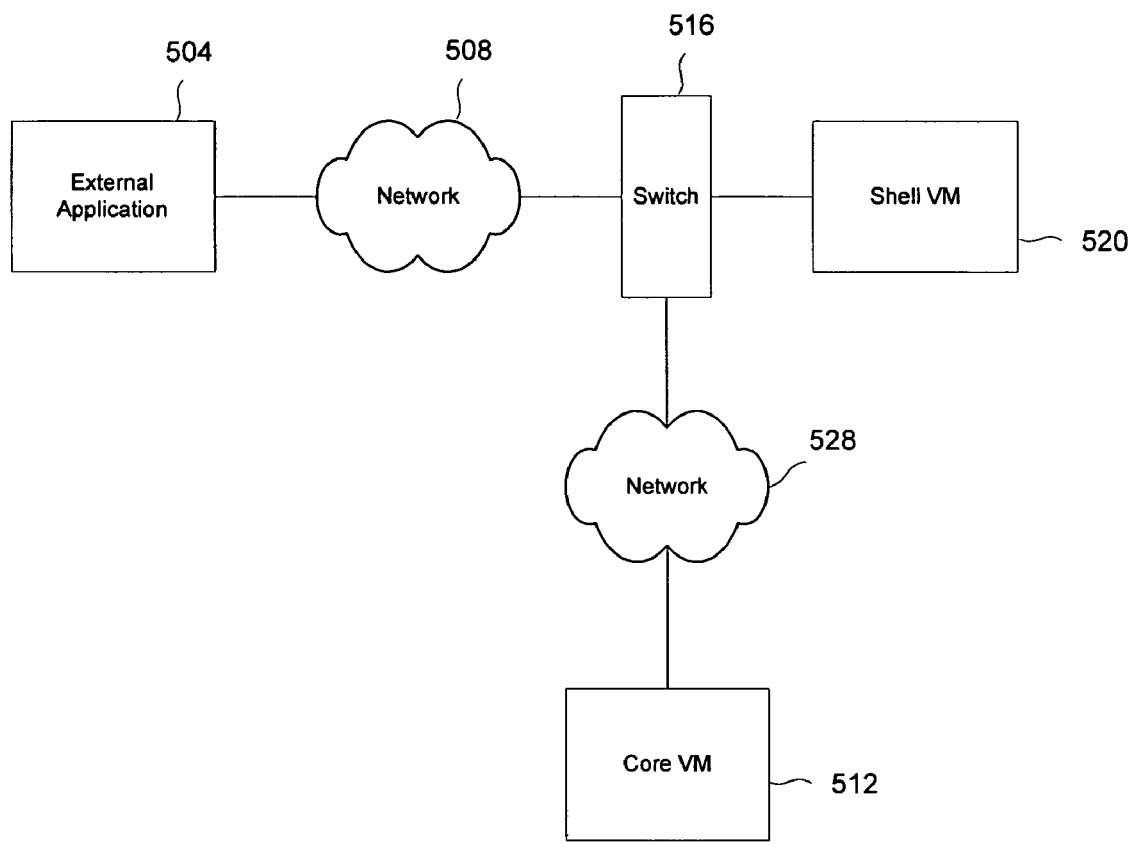
FIG. 5A is a block diagram illustrating a more general topology in which a connection may be stitched.

FIG. 5A is a block diagram illustrating a more general topology in which a connection may be stitched. The system is shown to include external application 504, network 508, network 528, core VM 512, switch 516, and shell VM 520. Network 508 and network 528 may include any number of devices. Core VM 512 and shell VM 520 reside on separate devices. Switch 516 "surrounds" shell VM 520 in that switch 516 separates external application 504 and core VM 512 from shell VM 520. Accordingly, switch 516 can intercept TCP packets being sent from the external application or the core VM to the shell VM.

In some embodiments, if a decision is made to stitch, shell VM 520 is preconfigured to stitch with a certain switch, such as switch 516. In other embodiments, shell VM 520 is not initially aware of a switch with which it can stitch, but has the capability to automatically determine whether stitching is available with a switch on the network. If a decision is made to stitch, shell VM 520 stitches with that switch.

Figure 5B:
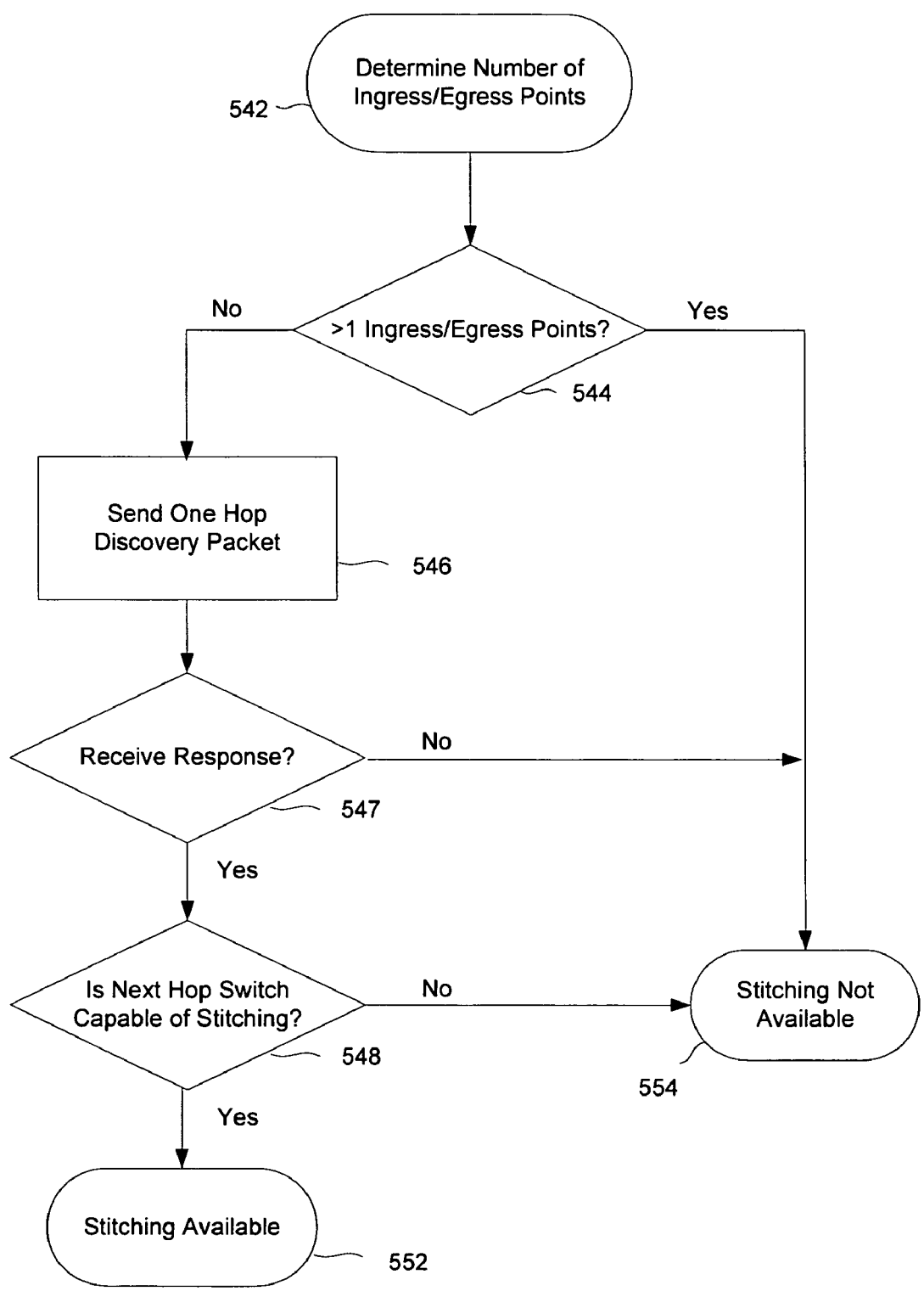
FIG. 5B is a flowchart illustrating a process for evaluating whether to redirect information.

In FIG. 5A, shell VM 520 has one ingress/egress port and is one hop from switch 516. FIG. 5B is a flowchart illustrating a process for evaluating whether to redirect information. This example assumes that stitching is restricted to systems having the topology of FIG. 5A. In some embodiments, the shell VM performs this process. The number of ingress/egress points is determined (542). If there are more than one ingress/egress points, it is determined that stitching is not available (554). If there is one ingress/egress point, a one hop discovery packet is sent (546). The one hop discovery packet is used to determine whether there is a switch one hop from the shell VM that is capable of stitching. For example, the discovery packet may be sent according to a Middlebox communication (MIDCOM) protocol. It is determined whether a response to the one hop discovery packet is received (547). If there is no response, it is determined that stitching is not available (554). If there is a response, it is determined whether the next hop switch is capable of stitching (548) based on the response. For example, the response may include stitching capabilities of the switch. If the next hop switch is not capable of stitching, it is determined that stitching is not available (554). If the next hop is capable of stitching, it is determined that stitching is available (552). The decision of whether to actually stitch may then be made.

This example is one process that may be used to evaluate whether to redirect information. There are other topologies in which stitching may be available. The process shown may be altered as appropriate to account for other topologies as desired.

In some embodiments, this process is performed during the discovery process described in U.S. patent application Ser. No. 10/378,061, entitled SEGMENTED VIRTUAL MACHINE filed Feb. 28, 2003 which is incorporated herein by reference for all purposes.

Figure 5C:
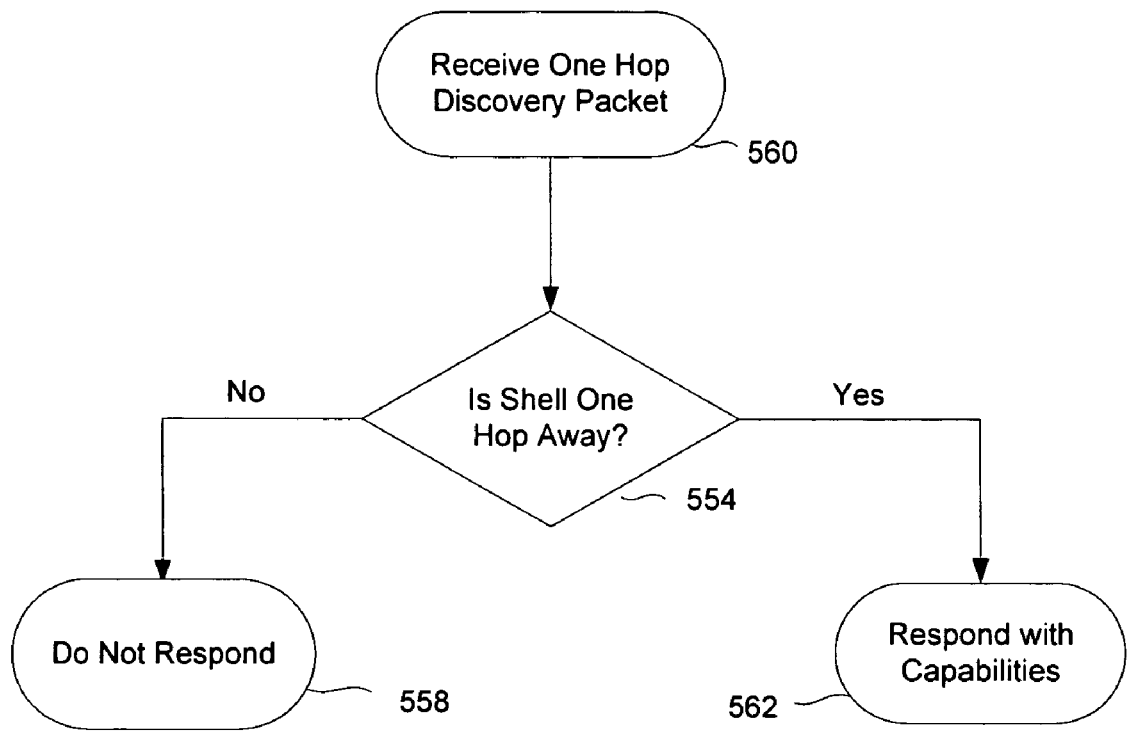
FIG. 5C is a flowchart illustrating a process for responding to a one hop discovery packet.

FIG. 5C is a flowchart illustrating a process for responding to a one hop discovery packet. In some embodiments, switch 516 performs this process. A one hop discovery packet is received (560). It is determined whether the shell VM is one hop away (554). When the switch is one hop away, the switch responds with its capabilities, such as whether it can stitch. When the switch is not one hop away, it does not respond.

Step 554 is optional. In some embodiments, the one hop discovery packet dies after one hop. Thus, if the switch is more than one hop from the shell VM, the switch does not receive the one hop discovery packet.

In the examples above, the switch and core VM are shown to reside on separate devices. In some embodiments, the switch and core VM are combined in one device. Because the combined device includes stitching capabilities, there is no need to discover a switch with which to stitch.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of redirecting information in a segmented virtual machine (VM) including a shell VM and a core VM, the method comprising:
    establishing a first connection between an external application and the shell VM via a switch to transfer information between the external application and the core VM via the switch, the shell VM, and a communication link between the shell VM and the core VM;
    establishing a second connection between the shell VM and the core VM via the switch such that the information between the external application and the core VM is transferred via the shell VM, the switch, and the second connection instead of the communication link; and
    using the switch to stitch a portion of the first connection between the external application and the switch and a portion of the second connection between the switch and the core VM to redirect the information between the external application and the core VM, wherein the switch transfers data via the portion of the first connection and the portion of the second connection, thereby bypassing the shell VM; wherein:
    the shell VM and the core VM each perform some but not all functions of the segmented VM.

2. The method of claim 1, wherein redirecting includes receiving the information at the switch.

3. The method of claim 1, wherein the information is redirected to the core VM.

4. The method of claim 1, wherein the information is redirected to the external application.

5. The method of claim 1, wherein the information is included in a TCP packet or TCP connection.

6. The method of claim 1, wherein a packet received by the core VM includes a translated address indicating that the packet has been sent by the shell VM.

7. The method of claim 1, wherein a packet received by the external application includes a translated address indicating that the packet has been sent by the shell VM.

8. The method of claim 1, wherein redirecting includes translating an address within a packet.

9. The method of claim 1, further including determining that the information should be redirected.

10. The method of claim 1, wherein the information is redirected once a connection associated with the information lasts longer than a certain period of time.

11. The method of claim 1, wherein the information is redirected once a connection associated with the information sends more than a certain number of packets.

12. The method of claim 1, wherein the information is redirected once the shell VM device carries a certain load.

13. The method of claim 1, further including:
    receiving a message indicating that the information sending has been completed; and
    sending a control message.

14. The method of claim 1, further including:
    receiving a message indicating that the information sending has been completed; and
    forwarding the message.

15. The method of claim 1, further including:
    receiving a message indicating that the information sending has been completed;
    translating the message; and
    sending the translated message.

16. The method of claim 1, wherein a device that includes the switch and the core VM redirects the information.

17. The method of claim 16, further including determining the number of ingress and egress points on a device.

18. The method of claim 1, wherein a device that includes the switch and the shell VM redirects the information.

19. The method of claim 1, wherein a device that includes the shell VM, the core VM, and the switch redirects the information.

20. The method of claim 19, further including determining whether the switch is one hop away from a device that sent the discovery packet.

21. The method of claim 1, wherein redirecting the information further comprises:
sending a discovery packet;
receiving a reply to the discovery packet; and
determining whether the switch is capable of stitching based on the reply by examining the reply to determine whether the reply includes an indication of whether the switch has stitching capability.

22. The method of claim 1, further comprising:
receiving a discovery packet at the switch; and
sending a response indicating a capability of the switch.

23. A system for redirecting information in a segmented VM including a shell VM and a core VM, comprising:
a device on which the shell VM operates; and
a switch configured to:
establish a first connection between an external application and the shell VM to transfer information between the external application and the core VM via the switch, the shell VM, and a communication link between the shell VM and the core VM;
establish a second connection between the shell VM and the core VM such that the information between the external application and the core VM is transferred via the shell VM, the switch, and the second connection instead of the communication link; and
stitch a portion of the first connection between the external application and the switch and a portion of the second connection between the switch and the core VM to redirect the information between the external application and the core VM, wherein the switch transfers data via the portion of the first connection and the portion of the second connection, thereby bypassing the shell VM; wherein:
the shell VM and the core VM each perform some but not all functions of the segmented VM.

24. The system of claim 23, further comprising a second device that includes an external application.

25. The system of claim 23, wherein the device includes a core VM.

26. The system of claim 23, wherein:
the shell VM configured to:
send a discovery packet;
receive a reply to the discovery packet; and
determine whether the switch is capable of stitching based on the reply by examining the reply to determine whether the reply includes an indication of whether the switch has stitching capability; and
the system further comprises the switch configured to send a reply to the discovery packet.

27. The system of claim 23, wherein:
the shell VM configured to send a discovery packet; and
the system further comprises the switch configured to:
receive the discovery packet; and
respond with a capability of the switch.

* * * * *